United States Patent [19]

Lehner et al.

[11] Patent Number: 4,568,610

[45] Date of Patent: Feb. 4, 1986

[54] MAGNETIC RECORDING MEDIA

[75] Inventors: August Lehner, Roedersheim-Gronau; Werner Balz, Limburgerhof; Milan Velic, Ludwigshafen; Helmut Kopke, Weisenheim; Werner Grau, Bobenheim-Roxheim; Reinhold Baur, Offenburg, all of Fed. Rep. of Germany

[73] Assignee: BASF Aktiengesellschaft, Fed. Rep. of Germany

[21] Appl. No.: 672,700

[22] Filed: Nov. 19, 1984

[30] Foreign Application Priority Data

Nov. 18, 1983 [DE] Fed. Rep. of Germany ....... 3341698

[51] Int. Cl.$^4$ .............................................. G11B 5/70
[52] U.S. Cl. .............................. 428/425.9; 252/62.54; 427/128; 428/413; 428/522; 428/524; 428/532; 428/694; 428/900; 360/134; 360/135; 360/136
[58] Field of Search ..................... 428/425.9, 900, 694, 428/524, 522, 413, 532; 427/128; 360/134–136; 252/62.54

[56] References Cited

U.S. PATENT DOCUMENTS

| | | | |
|---|---|---|---|
| 2,871,218 | 1/1959 | Schollenberger | 528/76 |
| 3,149,995 | 9/1964 | Bauer | 428/694 |
| 3,150,995 | 9/1964 | Bauer | 428/694 |
| 3,247,017 | 4/1966 | Eichler | 428/694 |
| 3,320,090 | 3/1967 | Graubert | 428/694 |
| 3,558,353 | 1/1971 | Harada | 428/694 |
| 4,058,646 | 11/1977 | Vaeth | 428/694 |
| 4,320,171 | 3/1982 | Motz | 428/423.1 |
| 4,324,438 | 11/1980 | Horigome | 252/62.54 |
| 4,328,282 | 3/1982 | Lehner | 428/694 |
| 4,368,238 | 1/1983 | Somezawa | 428/694 |

Primary Examiner—Ellis P. Robinson
Attorney, Agent, or Firm—Keil & Weinkauf

[57] ABSTRACT

Magnetic recording media comprise a non-magnetic base which is provided with a magnetic layer consisting of finely divided anisotropic magnetic material which is dispersible in binders and additives, the binder being a mixture of (1) an OH-containing polyurethane which is crosslinked with polyisocyanates, (2) a high molecular weight thermoplastic linear polyurethane and (3) a polyvinylformal binder, a phenoxy resin, a cellulose ester or a vinyl chloride copolymer.

2 Claims, No Drawings

MAGNETIC RECORDING MEDIA

The present invention relates to magnetic recording media which consist of a non-magnetic base provided with a magnetic layer consisting of finely divided anisotropic magnetic material dispersed in binders and additives, and in which the binder is a mixture based on an OH-containing polyurethane, which is crosslinked with polyisocyanates, and further physically drying binders.

Magnetic layers which are used in modern audio-recorders, video recorders and playback apparatuses have to meet a number of different requirements. In addition to the high requirements which the recording and playback characteristics of audio tapes, video tapes and computer tapes have to meet, there is a constant demand for adaptation and improvement of, in particular, the mechanical properties of the recording media. The magnetic layers must be very flexible and possess high elasticity great tensile strength. Moreover, reduced friction and greater abrasion resistance and resistance to wear are increasingly being demanded, in order to avoid drops in output level. In particular, the requirement for systems in which the magnetic layer adheres firmly to the base without an adhesion promoter is especially difficult to meet when at the same time good stability to high humidity and temperature and good magnetic and electroacoustic properties are required.

Since magnetic recording media are provided with layers possessing low surface roughness in order to improve the electroacoustic properties, soft thermoplastic magnetic layers may tend to stick at as low as 20°–30° C., but particularly at elevated temperatures and high humidity. As a result, the tapes block. These difficulties can be eliminated in the case of somewhat rougher magnetic layers only at the expense of the electroacoustic properties.

In order to avoid these drawbacks, it is necessary, in addition to using particularly suitable magnetic materials, such as chromium dioxide, cobalt-doped iron oxides and ferromagnetic metal particles, to select all the materials present in the magnetic layer so that the latter, in addition to exhibiting particularly high residual induction in the recording direction and having the required smooth surface, possesses improved mechanical properties. Such magnetic layers must contain a high proportion of magnetizable material, and these magnetizable acicular particles must be very easy to orient in the intended recording direction in the magnetic layer. For a given magnetic material, improving the stated properties, such as surface roughness, residual induction and orientation ratio, while at the same time achieving excellent mechanical properties is precisely what is dependent on the binders and additives used for the production of the magnetic layer. The additives primarily include the lubricants, water repellants and dispersants, the use of which influences the electroacoustic, magnetic and mechanical properties of the tapes.

Reduction of the surface roughness of the magnetic layer is particularly important in the case of high quality magnetic recording media, since particularly close tape/head contact is required for resolving very short wavelengths. Hence, the tapes have to be very hardwearing, since damage to the layer immediately leads to drops in output level.

A number of attempts have been made to solve the problems described. For example, mixtures of binders, eg. highly polymeric polyurethanes with other polymers, are supposed to provide a remedy. However, mixtures of this type generally do not result in adequate magnetic or electroacoustic properties. The use of special OH-containing polyurethane binders, which are crosslinked with polyisocyanates, alone or as a mixture with a phenoxy resin, with a high molecular weight polyurethane, with a polyvinylformal or with a cellulose ester, has also been proposed. Although this results in very good magnetic and electroacoustic properties in conjunction with a smaller number of tape errors, good frictional properties and high resistance to wear, the stability at high temperatures and high humidity is particularly unsatisfactory. The large number of attempts to overcome disadvantages and deficiencies, such as excessively high thermoplasticity, excessively low stability to tropical climates, excessively low abrasion resistance after storage under controlled conditions of temperature and humidity and drops in output level as a result of poor durability, or advantageously to influence one or other of these factors, by a combination of a plurality of measures have not always been satisfactory. Particularly when different binder systems are used and at the same time good magnetic electroacoustic properties have to be achieved, the solutions proposed to date were therefore unsatisfactory for achieving optimum results.

It is an object of the present invention to provide magnetic recording media in which, as a result of the use of special binder combinations, the adhesion and the stability in tropical climates are improved and at the same time the thermoplasticity and frictional properties as well as the magnetic and electroacoustic properties are not adversely affected. Furthermore, delamination of the layer from the base, and drops in output level, are avoided, and blocking of the tapes under extreme conditions is prevented.

We have found that this object is achieved, and that, surprisingly, magnetic recording media of the type stated at the outset meet the requirements set if the binder mixture consists of 1. from 50 to 90% by weight of a low molecular weight OH-containing polyurea-urethane which has an OH number of from 30 to 130 and a molecular weight of from 2,000 to 30,000, and is prepared from
   1.IA 1 mole of a polydiol having a molecular weight of from 400 to 4000,
   1.IB from 0.2 to 10 moles of a diol of 2 to 18 carbon atoms,
   1.IC from 0.1 to 4 moles of a primary or secondary aminoalcohol of 2 to 20 carbon atoms,
   1.ID from 0 to 1 mole of a triol and
   1.II from 1.20 to 13 moles of a diisocyanate of 6 to 30 carbon atoms, the amount of NCO groups of the diisocyanate being from 65 to 95%, based on components 1.IA to 1.ID, of the number of equivalents of OH and NH groups, with the proviso that the unpigmented crosslinked film has a tensile strength greater than $15N/mm^2$, and an elongation at break greater than 50%, a modulus of elasticity greater than $150N/mm^2$ and a pendulum hardness of from 30 to 140 sec, 2. from 5 to 45% by weight of a high molecular weight thermoplastic linear polyurethane which is soluble in tetrahydrofuran, has a molecular weight of from 40,000 to 150,000 and is prepared from
   2.A 1 mole of a polyesterol having a molecular weight of from 400 to 4,000, 2.B from 0.3 to 15 moles of a straight-chain aliphatic diol of 2 to 10 carbon atoms, 2.C from 0 to 1.5 moles of a triol of 3 to 10 carbon atoms and 2.D from 1.25 to 17 moles of a diisocyanate of 6 to 30 carbon atoms, the amount of NCO groups being about the same as the total amount of OH groups in components 2.A to 2.C together, with the proviso that the unpigmented film has a tensile strength of from 40 to 95N/mm$^2$ and an elongation at break of from 100 to 1,400%, and 3. from 5 to 45% by weight of a polyvinylformal binder containing not less than 65% of vinylformal groups, or of a copolymer of from 50 to 95% by weight of vinyl chloride and from 5 to 50% by weight of a mono- or diester of an aliphatic diol of 2 to 4 carbon atoms with acrylic acid or methacrylic acid, or of a phenoxy resin of the formula

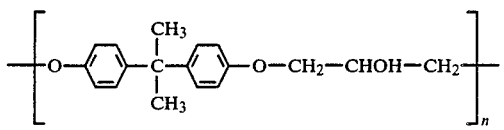

where n is about 100, or of a di- and/or a triester of cellulose with one or more carboxylic acids of 1 to 4 carbon atoms, or of a copolymer of 91% of vinyl chloride base units, 3% of vinyl acetate base units and 6% of vinyl alcohol base units.

The OH-containing polyurea-urethane binders (component 1) which are suitable for the novel recording media and are crosslinked with polyisocyanates possess, when in the form of unpigmented films after crosslinking, a tensile strength (according to DIN 53,455) greater than 15, preferably greater than 30, N/mm$^2$, an elongation at break (according to DIN No. 53,455) greater than 30%, preferably greater than 70%, a modulus of elasticity (according to DIN No. 53,457) greater than 150, preferably greater than 200N/mm$^2$, and a pendulum hardness (according to DIN 53,157) of from 30 to 140, preferably from 50 to 110, sec. The OH number of component 1 is from 30 to 160, preferably from 40 to 120, and the number average molecular weight is from 1,500 to 40,000 (corresponding to a K value of from 17 to 45), preferably from 2,500 to 25,000 (corresponding to a K value of from 19 to 35).

In synthesizing these polymers, it has proven advantageous for some, preferably more than 70%, in particular more than 90%, of the terminal OH groups to consist of

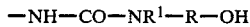

or

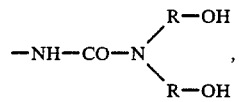

where R is —(CH$_2$)—$_n$, R$^1$ is H, —CH$_3$, —(CH$_2$)$_n$—CH$_3$ and n is from 1 to 10.

Polymers having this structure possess lower thermoplasticity than those without these terminal groups. This also permits the content of terminal OH groups to be increased, with the result that, during crosslinking with a polyisocyanate, the degree of crosslinking can vary within wide limits, depending on the requirements which the magnetic layer has to meet. The urea groups, which increase the dispersibility with regard to the conventional magnetic materials, are also advantageous.

For the preparation of component 1, a polydiol having a molecular weight of from 400 to 4,000, preferably from 700 to 2,500, is employed as building block 1.IA. The conventional polyesterols, polyetherols, polycarbonates and polycaprolactams are suitable for this purpose.

The polyesterols are advantageously predominantly linear polymers having terminal OH groups, preferably those having 2 terminal OH groups. The acid number of the polyesterols is less than 10, preferably less than 3. The polyesterols can be prepared in a simple manner by esterification of aliphatic dicarboxylic acids of 4 to 12, preferably 4 to 6, carbon atoms, with aliphatic glycols, preferably those of 2 to 12 carbon atoms, or by polymerization of lactones of 3 to 6 carbon atoms. Examples of suitable aliphatic dicarboxylic acids are glutaric acid, pimelic acid, suberic acid, sebacic acid, dodecanedioic acid and preferably adipic acid and succinic acid. The dicarboxylic acids can be used individually or as mixtures. In preparing the polyesterols, it may be advantageous if, instead of the dicarboxylic acids, the corresponding acid derivatives, eg. carboxylates where the alcohol radical is of 1 to 4 carbon atoms, carboxylic anhydrides or carboxylic acid chlorides, are used. Examples of suitable glycols are diethylene glycol, pentanediol, decane-1,10-diol and 2,2,4-trimethylpentane-1,5-diol. Ethane-1,2-diol, butane-1,4-diol, hexane-1,6-diol and 2,2-dimethylpropane-1,3-diol are preferably used. Depending on the properties which the polyurethanes are required to possess, the polyols can be used either alone or as a mixture, various ratios of components being possible for the mixture. Suitable lactones for the preparation of the polyesterols are α,α-dimethyl-β-propiolactone, γ-butyrolactone and, preferably, ε-caprolactone.

The polyetherols are essentially linear substances which possess terminal hydroxyl groups, contain ether bonds and have a molecule weight of about 600–4,000, preferably 1,000–2,000. Suitable polyetherols can easily be prepared by polymerization of cyclic ethers, such as tetrahydrofuran, or by reaction of one or more alkylene oxides, where alkylene is of 2 to 4 carbon atoms, with an initiator molecule which contains two bonded active hydrogen atoms. Examples of alkylene oxides are ethylene oxide, 1,2-propylene oxide, epichlorohydrin, 1,2-butylene oxide and 2,3-butylene oxide. The alkylene oxides can be used individually, alternately one after the other, or as a mixture. Examples of suitable initiator molecules are water, glycols, such as ethylene glycol, propylene glycol, butane-1,4-diol or hexane-1,6-diol, amines, such as ethylenediamine, hexamethylenediamine or 4,4′-diaminodiphenylmethane, and aminoalcohols, such as ethanolamine. Like the polyesterols, the polyetherols, too, can be used alone or as a mixture.

Diols of 2 to 18, preferably 2 to 6, carbon atoms are employed as building block 1.IB, eg. ethane-1,2-diol, propane-1,3-diol, butane-1,4-diol, hexane-1,6-diol, pentane-1,5-diol, decane-1,10-diol, 2-methylpropane-1,3-diol, 2,2-dimethylpropane-1,3-diol, 2,2-dimethylbutane-1,4-diol, 2-methyl-2-butylpropane-1,3-diol, neopentylglycol hydroxypivalate, diethylene glycol, triethylene glycol and methyldiethanolamine.

With regard to achieving particular properties of the novel recording media, it has proven advantageous in the preparation of the OH-containing polyurea-urethanes if some or all of the building blocks 1.IB are diamines of 2 to 15 carbon atoms, eg. ethylenediamine, 1,6-hexamethylenediamine, 4,9-dioxadodecane-1,12-diamine or 4,4'-diaminodiphenylmethane, or aminoalcohols, eg. monoethanolamine, monoisopropanolamine or 4-methyl-4-aminopentan-2-ol.

The stated diols, as building blocks 1.IB, can also be completely or partly replaced by water or by the primary or secondary aminoalcohols which are also listed below as building blocks 1.IC.

These aminoalcohols (building block 1.IC) of 2 to 20, preferably 3 to 6, carbon atoms include monoethanolamine, methylisopropanolamine, ethylisopropanolamine, methylethanolamine, 3-aminopropanol, 1-ethylaminobutan-2-ol, 4-methyl-4-aminopentan-2-ol and N-(2-hydroxyethyl)-aniline. Secondary aminoalcohols are particularly suitable since they undergo addition at the chain ends and hence improve the solubility of the polymers. Methylethanolamine, diethanolamine and diisopropanolamine have proven particularly advantageous.

Compounds of 3 to 18, preferably 3 to 6, carbon atoms are used as triols (building block 1.ID). Examples of appropriate triols are glycerol, trimethylolpropane and hexanetriol, but low molecular weight reaction products, for example those of glycerol or trimethylolpropane with ethylene oxide and/or propylene oxide, are also suitable. The presence of triols during the polyaddition results in branching of the end product, and this has an advantageous effect on the mechanical properties of the polyurethane, provided that localized crosslinking does not take place.

To form the OH-containing polyurea-urethanes, the building blocks stated under 1.I are reacted with aliphatic, cycloaliphatic or aromatic diisocyanates of 6 to 30 carbon atoms (building block 1.II). Compounds such as toluylene 2,4-diisocyanate, toluylene 2,6-diisocyanate, m-phenylene diisocyanate, 4-chlorophenylene-1,3-diisocyanate, naphthylene-1,5-diisocyanate, hexamethylene-1,6-diisocyanate, cyclohexylene 1,4-diisocyanate, tetrahydronaphthylene 1,5-diisocyanate, diphenylmethane diisocyanate, dicyclohexylmethane diisocyanate and isophorone diisocyanate are particularly suitable for this purpose. The OH-containing polyurethanes based on toluylene diisocyanate and isophorone diisocyanate are very soluble in tetrahydrofuran and dioxane.

Where from 0.2 to 10, preferably from 0.5 to 5, moles of the straight-chain aliphatic diol of 2 to 18 carbon atoms and, if required, from 0.01 to 1, preferably from 0.15 to 5, mole of triol are used, the ratio of building blocks 1.I and 1.II can be varied so that there are from 1.20 to 13 moles of diisocyanate per mole of polydiol, the amount of straight-chain diol used partly depending on the molecular weight of the polydiol used. The isocyanate should be used in an amount which is less than the stoichiometric amount by from 5 to 35%, based on the amount of NH-containing or hydroxyl containing compounds, so that at the end of the reaction free, unreacted hydroxyl groups are present, but virtually no free, unreacted isocyanate. However, for practical reasons and reasons relating to surface technology, it is often advantageous, in a preliminary reaction of the building blocks 1.IA, 1.IB, 1.ID and 1.II, to use an excess of diisocyanate of from 5 to 40%, preferably from 10 to 30%, based on the amount required for complete reaction of the reactants, so that the ratio of the number of hydroxyl groups used to the number of isocyanate groups in this reaction stage is from about 1:1.05 to 1:1.4, preferably from about 1:1.1 to 1:1.30. In the second reaction stage, the building block 1.IC is then added in an amount such that the number of equivalents of NH corresponds to the NCO content, ie. from 0.1 to 4, preferably from 0.3 to 2.5, moles per mole of building 1.IA, or the NCO prepolymer is added to the aminoalcohol, so that the amino groups react with the isocyanate. Even in the case of polyurethanes which do not contain any triols, variation of the aminoalcohols gives polyurethanes having an OH functionality of from 2 to 4, the OH groups being predominantly at the chain ends. The use of polyurethanes incorporating triols increases the OH functionality correspondingly. This structure is advantageous for film formation and for the final crosslinking of the OH-containing polyurethane with the polyisocyanate. If, in this second reaction stage, the amount of NH or $NH_2$ groups supplied is slightly less than the stoichiometric amount, based on the NCO groups, some of the aminoalcohol is incorporated into the molecule and, depending on the aminoalcohol results in a branching point. If an excess of NH groups is used, the aminoalcohol is completely incorporated into the polymer structure only during the crosslinking reaction. Hence, by the choice of terminal groups, ie. by varying these groups, it is possible to adapt the polymer to the particular requirements, such as the ability to form films and the dispersibility.

The elastic thermoplastic OH-containing polyurea-urethanes possessing this structure are preferably prepared in solution by the 2-stage process, in the presence or absence of a catalyst and other assistants and/or additives. These products can also be prepared by a solvent-free batch method. However, because of the presence of any triols and the reaction of the amine with NCO groups, gel particles form at least in some cases during the polyaddition in the absence of a solvent; hence, the preparation is generally carried out in solution. In general, polyaddition in solution avoids the danger of localized excessive crosslinking, as occurs during polyaddition during the absence of a solvent.

Solvents which are preferably used for the preparation of the polyurethanes are cyclic ethers, such as tetrahydrofuran and dioxane, and cyclic ketones, such as cyclohexanone. Depending on the field of use, the polyurethanes can of course also be dissolved in other strongly polar solvents, such as dimethylformamide, N-methylpyrrolidone, dimethyl sulfoxide or ethylglycol acetate. It is also possible to mix the stated solvents with aromatics, such as toluene or xylene, or esters, such as ethyl acetate or butyl acetate.

Examples of suitable catalysts for the preparation of the polyurethanes and for the crosslinking reaction are tertiary amines, such as triethylamine, triethylenediamine, N-methylpyridine or N-methylmorpholine, metal salts, such as tin octoate, lead octoate or zinc stearate, and organometallic compounds, such as dibutyl-tin dilaurate. The amount of catalyst to be used depends on the activity of the particular catalyst employed. In general, it has proven advantageous to use from 0.005 to 0.3, preferably from 0.01 to 0.1, part by weight per 100 parts by weight of polyurethane.

In the 2-stage polyaddition process, the diisocyanate is initially taken, and the building blocks 1.IA, 1.IB and 1.ID and, if required, the catalyst and the assistants and additives in a solvent are added at from 20° to 90° C., preferably from 30° to 70° C., in the course of from 0.5 to 5 hours. The components are reacted until the desired NCO content is reached, and then, in the 2nd stage, the building block 1.IC is added, or this building block is initially taken and the polymer is added. In the 2-stage process, the 1st stage is carried out using an NCO excess, based on building blocks 1.IA, 1.IB and 1.ID.

The polyurethane elastomers present as component 2 in the binder mixture for the novel recording media are known. These elastomers and their preparation are described in, inter alia, German Published Applications DAS No. 2,442,763 and DAS No. 2,753,694.

Polyurethanes which are particularly useful as high molecular weight binders in the magnetic layers are those which have a K value of from 50 to 70, a blocking point of not less than 120° C., an elongation at break of from 100 to 1400% (DIN No. 53,455) and a tensile strength of from 40 to 95N/mm² (DIN No. 53,455). It is particularly advantageous if these polyurethanes also possess terminal OH groups which can readily undergo crosslinking.

The physically drying binders present as component 3 in the binder mixture for the novel recording media are known. These are polyvinylformal binders prepared by hydrolysis of a polymer of a vinylester and subsequent reaction of the vinyl alcohol polymer with formaldehyde. The polyvinylformals advantageously contain not less than 65, in particular not less than 80, % by weight of vinylformal groups. Suitable polyvinylformals contain from 5 to 13% by weight of vinyl alcohol groups and from 80 to 88% by weight of vinylformal groups, and have a specific gravity of about 1.2 and a viscosity of from 50 to 120 centipoise, measured at 20° C. on a solution of 5 g of polyvinylformal in 100 ml of 1:1 phenol/toluene. Other suitable compounds, in addition to the polyvinylformal, are vinyl chloride/diol mono- or di-(meth)acrylate copolymers whih can be prepared, for example, in a conventional manner by solution or suspension copolymerization of vinyl chloride and the diol monomethacrylate or monoacrylate. The diol monoacrylate, diacrylate, monomethacrylate or dimethacrylate used for this purpose is an esterification product of acrylic acid or methacrylic acid with the appropriate molar amount of an aliphatic diol of 2 to 4 carbon atoms, such as ethylene glycol, butane-1,4-diol or, preferably, propanediol, the propanediol preferably consisting of propane-1,3-diol and from 0 to 50% by weight of propane-1,2-diol. The copolymers advantageously contain from 50 to 95% by weight of vinyl chloride and from 5 to 50% by weight of diol acrylate or methacrylate. Particularly suitable copolymers preferably contain from 70 to 90% by weight of vinyl chloride and from 10 to 30% by weight of diol monoacrylate or diol monomethacrylate. A 15% strength solution of particularly suitable copolymers, such as the vinyl chloride/propanediol monoacrylate copolymers, in a mixture of equal volumes of tetrahydrofuran and dioxane has a viscosity of about 30 cP at 25° C. The K values according to H. Fikentscher (Cellulosechemie 30 (1931), 59 et seq.) of the particularly suitable products are from 30 to 50, preferably about 40.

Phenoxy resins whose structure can be described by the repeating unit of the formula

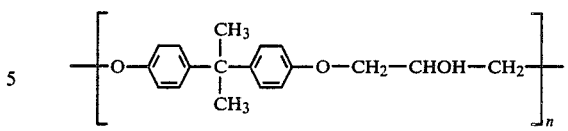

where n is about 100, can also advantageously be used as component 3. These are polymers as described in German Published Application DAS No. 1,295,011 and as are known under the trade names ®Epikote (from Shell Chemical Co.) or ®Epoxidharz PKHH (from Union Carbide Corporation).

Cellulose ester binders can also be used as component 3 in the binder mixture described. These are esterification products of cellulose and carboxylic acids of 1 to 4 carbon atoms, eg. cellulose acetate, cellulose triacetate, cellulose acetopropionate or cellulose acetobutyrate. Copolymers of 91% of vinyl chloride units, 3% of vinyl acetate units and 6% of vinyl alcohol units can also be employed for this purpose.

In order to obtain special properties it may be advantageous if components 1 to 3 each consist of two different polymers.

Further processing of the binder mixture, consisting of components 1, 2 and 3, with magnetic materials and assistants to give the novel magnetic recording media is carried out in a conventional manner.

Suitable anisotropic magnetic materials are the conventional ones which have a substantial effect on the properties of the resulting magnetic layer, eg. gamma-iron(III) oxide, finely divided magnetite, ferromagnetic undoped or doped chromium dioxide or cobalt-modified gamma-iron(III) oxide.

Acicular gamm-iron(III) oxide and ferromagnetic chromium dioxide are preferred. The particle size is in general from 0.2 to 2, preferably from 0.3 to 0.8, μm.

As is customary, the magnetic layers can furthermore contain small amounts of additives, such as dispersants and/or lubricants, as well as fillers, these being admixed during dispersing of the magnetic pigments or during the production of the magnetic layer. Examples of such additives are fatty acids and isomerized fatty acids, eg. stearic acid or its salts with metals of main groups one to four of the periodic table of elements, amphoteric electrolytes, such as lecithin, and fatty acid esters, waxes, silicone oils, carbon black, etc. The additives are present in a conventional amount, which is in general less than 10% by weight, based on the magnetic layer.

The ratio of magnetic material to binder in the novel recording materials is from 1 to 10, in particular from 3 to 6, parts by weight of magnetic material per part by weight of the binder mixture. A particular advantage is that, because of the excellent pigment-binding capacity of the special polyurethanes, high concentrations of magnetic material are possible in the magnetic layers without the mechanical-elastic properties being adversely affected or the performance characteristics suffering noticeably.

Suitable non-magnetic and non-magnetizable bases are the conventional rigid or flexible ones, in particular films consisting of linear polyesters, such as polyethylene terephthalate, which are in general from 4 to 200, in particular from 10 to 36, μm thick. Recently, the use of magnetic layers on paper bases for electronic computing and accounting machines has also become important; the novel coating materials can also advantageously be used for this purpose.

The magnetic recording media according to the invention can be produced in a conventional manner. Advantageously, the magnetic pigment dispersion prepared in a dispersing apparatus, eg. a tubular ball mill or a stirred ball mill, from the magnetic material and a solution of the binders with the addition of dispersants and other additives is mixed with the polyisocyanate crosslinking agent, and the mixture is filtered and then applied onto the non-magnetic base with the aid of a conventional coating apparatus, eg. a knife-coater. In order to achieve good electroacoustic and magnetic properties while employing a relatively short dispersing time, it is advantageous if dispersing is carried out with component 1, and components 2 and 3 are stirred in after the dispersing process. This method can be employed because the stated components 2 and 3 are highly compatible with component 1. As a rule, magnetic orientation is first effected before the liquid coating mixture is dried on the base; the latter procedure is advantageously carried out at from 50° to 90° C. for from 2 to 5 minutes. The magnetic layers can be calendered on conventional apparatuses by being passed between polished rollers optionally heated to from 25° to 100° C., preferably from 60° to 80° C. The magnetic layer is in general from 2 to 20, preferably from 4 to 10, μm thick. Where magnetic tapes are being produced, the coated films are slit in the longitudinal direction into the conventional widths, which are generally given in inches.

Crosslinking of the polyurethane binder with polyisocyanates is essential for achieving the advantageous properties of the novel magnetic recording media. A large number of organic di-, tri- or polyisocyanates or isocyanate prepolymers having a molecular weight as high as 10,000, preferably from 500 to 3,000, can be used for crosslinking. Polyisocyanates carrying more than 2 NCO groups per molecule are preferred, while those which are based on toluylene diisocyanate, hexamethylene diisocyanate or isophorone diisocyanate and are formed by polyaddition to diols and triols or by biuret formation and isocyanurate formation have proven particularly useful. An adduct of toluylene diisocyanate with trimethylolpropane and diethylene glycol is particularly advantageous.

The polyisocyanate component is added in an amount such that the OH:NCO ratio is from 1:0.3 to 1:2.0, preferably from 1:0.5 to 1:1.5, based on the OH groups of the polyurethane binders to be crosslinked.

Compared with the recording media produced using prior art polyurethane-containing and polyurethaneurea-containing binder mixtures, the magnetic recording media according to the invention exhibit better adhesion coupled with improved stability to high temperature and high humidity, and good electroacoustic properties, in particular with regard to maximum output level at short and long wavelengths as well as sensitivity. Another important feature is that processing of the conventional magnetic materials in conventional dispersing apparatuses to give highly pigmented homogeneous dispersions can be carried out easily and in particular in a very short time and with the consumption of very little energy. The fact that the solvent requirement during the dispersing process is as much as 40% lower is also noteworthy. Hence, magnetic recording media which possess substantially improved magnetic, and therefore also electroacoustic, properties, can be obtained by a simplified and shorter procedure.

In the Examples and Comparative Experiments which follow, parts and percentages are by weight, unless stated otherwise. Parts by volume bear the same relation to parts by weight as the liter to the kilograms.

EXAMPLE A

Polymer A (component 1)

A solution of 100.05 g of toluylene diisocyanate in 107 g of tetrahydrofuran was heated at 60° C., and one drop of dibutyl-tin dilaurate was added. 150 g of an OH-containing polyester obtained from adipic acid and butane-1,4-diol and having a molecular weight of 1,000 and 41.2 g of hexanediol, dissolved in 200 g of tetrahydrofuran, were added in the course of 2.5 hours. After one hour, a further drop of dibutyl-tin dilaurate was added. When the NCO content had reached 1.05%, the mixture was cooled to 45° C. and 15.75 g of diethanolamine were then added. The resulting product had a solids content of 50%, an OH number of 55 and a K value of from 24 to 28.

EXAMPLE B

Polymer B (component 1)

The preparation was carried out as for polymer A, except that the following building blocks were employed: 135.9 g of toluylene diisocyanate, 192.1 g of diphenylmethane diisocyanate, 640.5 g of the polyester stated in Example A, 71 g of hexane-1,6-diol, 3.43 g of trimethylolpropane, 56.6 g of diethanolamine, 0.6 g of dibutyl-tin dilaurate and 1100 g of tetrahydrofuran. The resulting product had a solids content of 50%, an OH number of 55 and a K value of from 26 to 30.

EXAMPLE 1

1.166 kg of tetrahydrofuran, 24.3 g of a 50% strength solution of the polyurea-urethane (polymer A), 1000 g of a ferromagnetic chromium dioxide having a mean needle length of 0.5 μm, 15 g of zinc oleate, 1.5 g of a commercial silicone oil and 10 g of n-butyl stearate were introduced into a steel ball mill having a capacity of 61 parts by volume and containing 8 kg of steel balls of 4–6 mm diameter, and the mixture was dispersed for 36 hours. The dispersion was then filtered under pressure, 105 g of a 20% strength solution of a phenoxy resin, prepared from epichlorohydrin and bisphenol A, and 210 g of a 20% strength polyurethane solution according to German Published Application DAS 2,753,694 were added to the stirred dispersion, and directly thereafter the dispersion was applied onto a 15 μm thick polyethylene terephthalate film. 100 g of tetrahydrofuran and 26 g of a 50% strength solution of a triisocyanate, obtained from 3 moles of toluylene diisocyanate and 1 mole of trimethylolpropane, in tetrahydrofuran were then added per kg of dispersion. The coated film was passed through a magnetic field to orient the magnetic particles, dried at from 50° to 80° C. and then calendered by being passed between heated rollers (60° C., nip pressure 200 kg/cm).

The films were slit into 3.81 mm wide tapes, and the electroacoustic properties were then determined according to DIN Nos. 45,401 45,403 and 45,512 (sheet 12), against reference tape C401R, and found to meet the requirements. The results obtained in the tests described below (tests 1–5) are listed in Table 1.

Test 1

Adhesion

In this test, the adhesion of the magnetic layer to the film is determined at 23° C. and 50% relative humidity, the procedure being as follows: a self-adhesive tape stuck on the layer is peeled off over a defined radius of separation at a constant rate of 0.5 m/sec. The effective force in cN is measured.

Test 2

Friction at very low relative velocity

The coefficient of friction is determined by measuring the tensile force which is produced by the friction between a moving magnetic tape and a stationary drum. The latter is a steel drum having a surface roughness of about 0.15 μm and a diameter of 70 mm. The piece of tape is 25 cm long and is drawn over the drum under a tape tension of 20 cN at a rate of 1 mm/sec and at a wraparound angle of 180°. The tensile force exerted on the drum, F, is a measure of the coefficient of friction $\mu$, where $\mu = (1/\pi) \times \ln(F/20)$.

The test was repeated after the piece of tape had been stored for 4 weeks at 30° C. and 93% relative humidity.

Test 3

Deposits 4 cassettes loaded with the magnetic tape are played back on a recorder for 20 hours at 40° C. and 55% relative humidity. Thereafter, the deposists on the erasing head, on the recording/playback head and on the capstan are assessed visually. The thickness of the deposits is assessed according to a rating system of 1 to 6 (1 denoting no deposits and 6 very thick deposits), and the average is taken.

The test was repeated after the piece of tape had been stored for 4 weeks at 30° C. and 93% relative humidity.

Test 4

Deposits under tropical climatic conditions 10 cassettes loaded with the magnetic tape are stored for 4 weeks at 40° C. and 93% relative humidity and then played back at 30° C. and 93% relative humidity. Assessment of the deposits is carried out as in test 3.

Test 5

Suitability for duplication

Groups of 10 cassettes are stored and operated under the same temperature and humidity conditions as in test 4. Each cassette is then subjected to one pass at 8 times the normal speed (38 cm/sec). The percentage of cassettes which exhibited disturbances in the running of the tape or blocking is given.

COMPARATIVE EXPERIMENT 1

The procedure described in Example 1 was followed, except that the polyurethane was omitted and instead 315 g of a 20% strength solution of the phenoxy resin were stirred in. The results are listed in Table 1.

COMPARATIVE EXPERIMENT 1a

The procedure described in Example 1 was followed except that the phenoxy resin was omitted and instead 315 g of the polyurethane described in Example 1 were stirred in. The results are given in Table 1.

TABLE 1

|  | Example 1 | Comparative Experiment 1 | Comparative Experiment 1a |
|---|---|---|---|
| Layer thickness | 5.3 | 5.2 | 5.4 |
| Test 1 | 10 | <5 | 11 |
| Test 2, before/after stroage under controlled conditions of temperature and humidity | 0.20/0.31 | 0.24/32 | 0.27/0.6 |
| Test 3, before/after storage under controlled conditions of temperature and humidity | 1.5/2.5 | 1.5/2.0 | 2.0/3.5 |
| Test 4 | 1.6 | 1.6 | 2.8* |
| Test 5 | 0 | 0 | 40 |

*3 out of 10 tapes blocked

EXAMPLE 2

The procedure described in Example 1 was followed, except that, instead of polymer A, polymer B was used as component 1, and instead of the phenoxy resin, a polyvinylformal consisting of 82% of vinylformal units, 12% of vinyl acetate units and 6% of vinyl alcohol units was employed. The test results are shown in Table 2.

COMPARATIVE EXPERIMENT 2

The procedure described in Example 2 was followed, except that the binder mixture consisted only of polymer B (component 1) and the corresponding amount of polyvinylformal (component 3). The test results are shown in Table 2.

COMPARATIVE EXPERIMENT 2a

The procedure described in Example 2 was followed, except that the binder mixture consisted only of polymer B (component 1) and the polyurethane (component 2). The test results are shown in Table 2.

TABLE 2

|  | Example 2 | Comparative Experiment 2 | Comparative Experiment 2a |
|---|---|---|---|
| Layer thickness | 5.0 | 5.1 | 5.0 |
| Test 1 | 17 | 5 | 20 |
| Test 2, before/after storage under controlled conditions of temperature and humidity | 0.19/0.25 | 0.24/0.32 | 0.33/0.70 |
| Test 3, before/after storage under controlled conditions of temperature and humidity | 1.5/2.5 | 1.5/2.0 | 2.0/3.5 |
| Test 4 | 1.8 | 1.7 | blocks |
| Test 5 | 0 | 0 | blocks |

We claim:

1. A magnetic recording medium which comprises a magnetic layer which is applied to a non-magnetic base and consists essentially of a dispersion of an anisotropic magnetic material in an organic binder of a mixture of (1) from 50 to 90% by weight of an OH-containing polyurethane compound which is finally crosslinked with a polyisocyanate, (2) from 5 to 45% by weight of thermoplastic linear polyurethane, and (3) from 5 to 45% by weight of a physically drying organic polymer, wherein component
(1) if a low molecular weight OH-containing polyureaurethane which has an OH number of from 30 to 130 and a molecular weight of from 2,000 to 30,000, and is prepared from

1.IA 1 mole of a polydiol having a molecular weight of from 400 to 4,000

1.IB from 0.2 to 10 moles of a diol of 2 to 18 carbon atoms,

1. IC from 0.1 to 4 moles of a primary or secondary amino-alcohol of 2 to 20 carbon atoms, 1.ID from 0 to 1 mole of a triol and 1.II from 1.20 to 13 moles of a diisocyanate of 6 to 30 carbon atoms, the amount of NCO groups of the diisocyanate being from 65 to 95%, based on components 1.IA to 1.ID, of the number of equivalents of OH and NH groups, with the proviso that the unpigmented crosslinked film of this component (1) has a tensile strength greater than $15N/mm^2$, and an elongation at break greater than 50%, a modulus of elasticity greater than $150N/mm^2$ and a pendulum hardness of from 30 to 140 sec, (2) is a high molecular weight thermoplastic linear polyurethane which is soluble in tetrahydrofuran, has a molecular weight of from 40,000 to 150,000 and is prepared from 2.A 1 mole of a polyesterol having a molecular weight of from 400 to 4,000, 2.B from 0.3 to 15 moles of a straight-chain aliphatic diol of 2 to 10 carbon atoms, 2.C from 0 to 1.5 moles of a triol of 3 to 10 carbon atoms and 2.D from 1.25 to 17 moles of a diisocyanate of 6 to 30 carbon atoms, the amount of NCO groups being about the same as the total amount of OH groups in components 2.A to 2.C together, with the proviso that the unpigmented film of this component 2 has a tensile strength of from 40 to $95N/mm^2$ and an elongation at break of from 100 to 1,400%, and (3) is a physically drying organic polymer selected from the group consisting of a polyvinylformal binder containing not less than 65% of vinylformal groups; a copolymer of from 50 to 95% by weight of vinyl chloride and from 5 to 50% by weight of a mono- or diester of an aliphatic diol of 2 to 4 carbon atoms with acrylic acid or methacrylic acid; a phenoxy resin of the formula

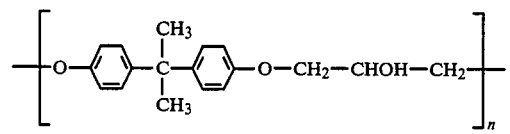

where n is about 100; a di- and/or a triester of cellulose with one or more carboxylic acids of 1 to 4 carbon atoms; and a copolymer of 91% of vinyl chloride base units, 3% of vinyl acetate base units and 6% of vinyl alcohol base units.

2. A magnetic recording medium as defined in claim 1, wherein the thermoplastic linear polyurethane (2) is finally crosslinked with a polyisocyanate.

* * * * *